Feb. 15, 1949.  F. J. SULLIVAN  2,461,785
QUICK RELEASE MECHANISM FOR PARACHUTE HARNESSES
Filed July 22, 1944  2 Sheets-Sheet 1
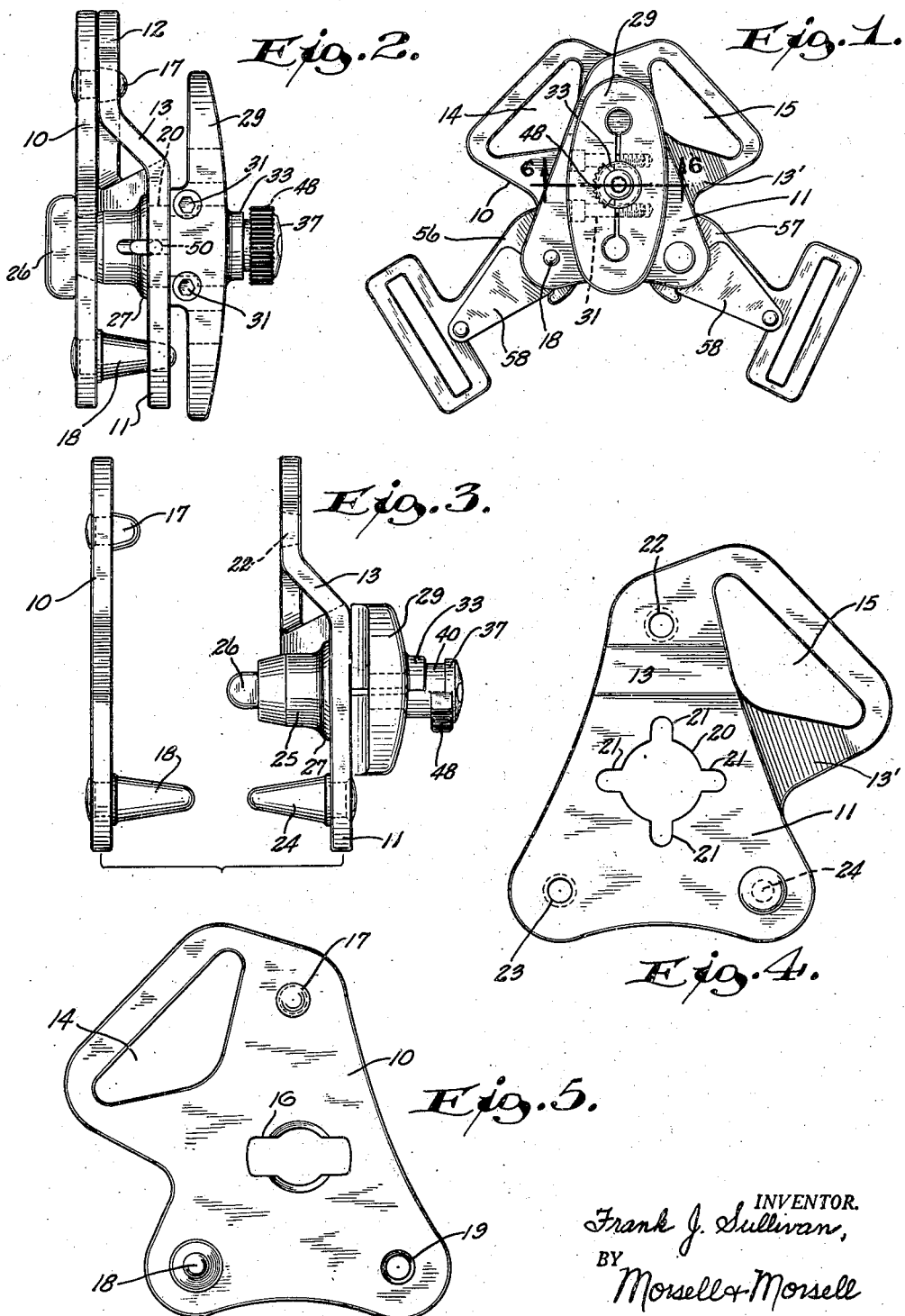
INVENTOR.
Frank J. Sullivan,
BY
Morsell & Morsell
ATTORNEYS.

Feb. 15, 1949.   F. J. SULLIVAN   2,461,785
QUICK RELEASE MECHANISM FOR PARACHUTE HARNESSES
Filed July 22, 1944   2 Sheets-Sheet 2
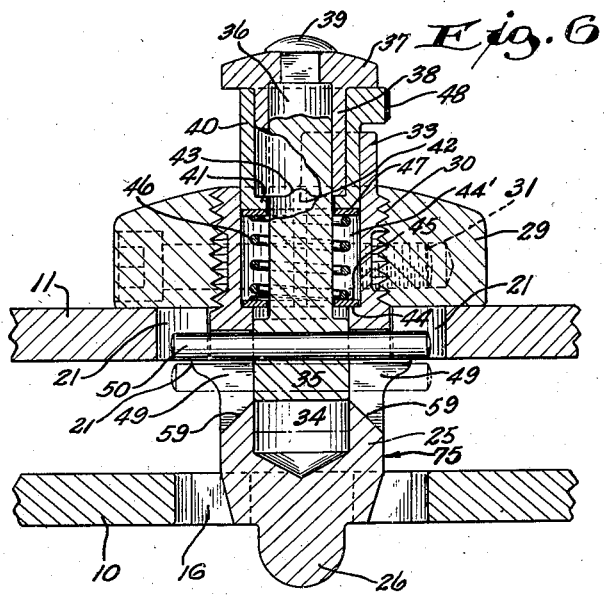
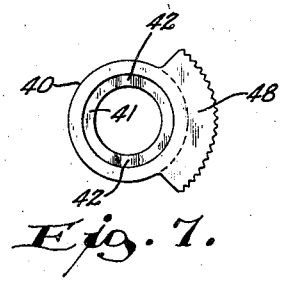
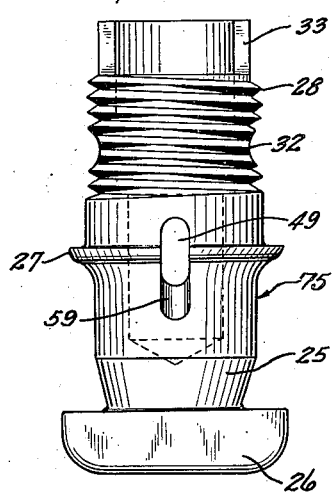
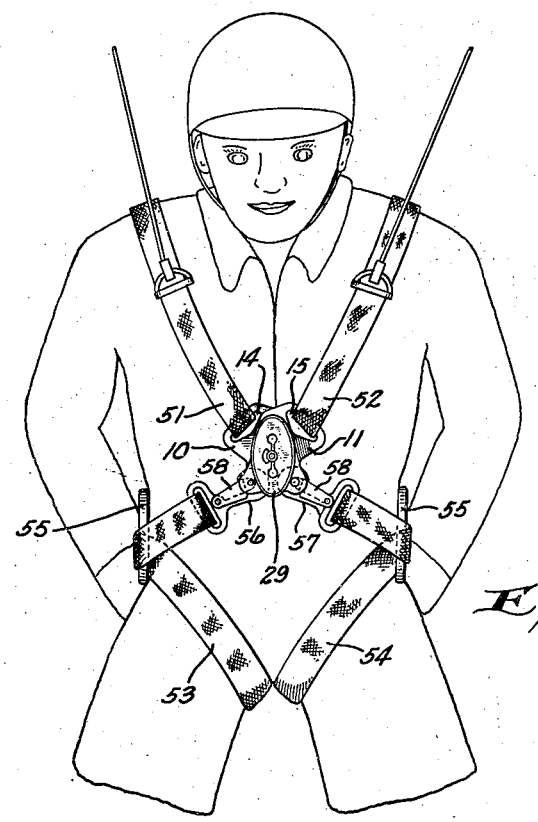
INVENTOR.
Frank J. Sullivan,
BY Morsell & Morsell
ATTORNEYS.

Patented Feb. 15, 1949

2,461,785

UNITED STATES PATENT OFFICE 2,461,785

QUICK RELEASE MECHANISM FOR PARACHUTE HARNESSES

Frank J. Sullivan, Oshkosh, Wis.

Application July 22, 1944, Serial No. 546,155

5 Claims. (Cl. 24—73)

This invention relates to improvements in quick release mechanism for parachute harness.

A general object of the invention is to provide an improved parachute harness clasp susceptible of quick release and separation for the attainment of instantaneous disengagement of the parachute harness from the wearer. A parachutist is bodily engaged by a harness to suspend the wearer from the parachute. When the parachutist reaches the end of his descent, he must be able to quickly rid himself of the harness and the attached parachute so that he will not be dragged by the parachute or become fouled therein.

With the above in mind, it is, therefore, an object of the invention to provide an improved, parachute harness clasp which, through a simple manual manipulation of the wearer, may be quickly released to separate the harness from the wearer and to quickly divest the wearer of this impediment.

A further object of the invention is to provide a parachute harness clasp which cannot become fouled or be rendered inoperative by the entrance of sand, dirt, grit or foreign matter.

A further object of the invention is to provide a simple, quickly releasable parachute harness clasp, comprising a plate, carrying one strap of a harness, and a complementary plate, carrying another strap of the harness, with a simple locking device releasably holding said plates together.

A further object of the invention is to provide a quickly releasable parachute harness clasp provided with adjustable means positionable to prevent the release of the clasp at such times as the wearer may not require quick removal of the harness, and as a safeguard against undesired, accidental release of the clasp, as through bumping or striking the same.

A further object of the invention is to provide a quickly releasable parachute harness clasp which, when it is released and disengages the harness from the wearer, is still attached to the harness for a subsequent use.

A further object of the invention is to provide a quickly realeasable parachute harness clasp which is simple and inexpensive to manufacture, which is strong and durable, which is easily and quickly manipulated, which is foolproof, and which is well adapted for the purposes disclosed.

With the above and other objects in view, the invention consists of the improved quick release mechanism for parachute harness, and its parts and combinations as set forth in the claims, and all equivalents thereof.

In the accompanying drawings, in which the same reference characters indicate the same parts in all of the views:

Fig. 1 is a front view of the improved quick release parachute harness mechanism in its assembled and locked condition;

Fig. 2 is an enlarged side view of the showing in Fig. 1;

Fig. 3 is a side view of the complementary plates of the quick release mechanism separated from one another and with the locking mechanism in its releasing position;

Fig. 4 is a face view of the outer plate of the mechanism;

Fig. 5 is a face view of the inner plate of the mechanism;

Fig. 6 is an enlarged fragmentary detailed sectional view through the mechanism in its assembled condition taken on line 6—6 of Fig. 1 only with the plunger button turned to a different position;

Fig. 7 is an enlarged top view of the collar-carrying sleeve of the mechanism;

Fig. 8 is an enlarged side view of the locking key portion of the mechanism; and Fig. 9 is a view of the quick release mechanism engaging a parachute harness as in use.

Referring more particularly to the drawings, the numeral 10 designates an inner plate, and the numeral 11, an outer plate. The outer plate 11 has an inwardly offset portion 12 connected to the main portion of the plate 11 by angular sections 13 and 13'.

Referring more particularly to Fig. 5, the lower plate 10 has an obliquely extending eye opening 14 for receiving the lower end of a harness strap, and the outer plate 11 has a similar eye opening 15, which extends obliquely in the opposite direction for receiving another end of the harness strap. The plate 10 is also formed with a keyhole 16, with a short, outwardly projecting, tapered pin 17, with a longer outwardly projecting tapered pin 18, and with a hole 19. The bore of the hole 19 is tapered inwardly. The outer plate 11 has a centrally located hole 20 formed with radially projecting communicating slots 21. The outer plate is also formed with holes 22 and 23, having tapered bores, for receiving the projecting pins 17 and 18 of the lower plate. Projecting inwardly from the right hand lower corner of the outer plate is a tapered pin 24, which is cooperable with the hole 19 of the lower plate.

A key for detachably locking the two plates together is shown in detail in Fig. 8 and is designated generally therein by the numeral 75. It consists of a tubular shank portion 25, having a key head 26 on its lower end. When the key head 26 is turned in the same direction as the extent of the keyhole 16, the head may be withdrawn through the hole. On the other hand, when the key head is in the position of Fig. 2, the two plates are locked together, as shown in said figure.

The outer end portion of the tubular shank 25 of the key extends through the opening 20 of the outer plate, and there is an annular shoulder 27 on the shank which engages the lower face of the outer plate 11. The outer end of the shank 25 is externally threaded, as at 28, for cooperation with a handle member 29, said handle having a threaded bore 30 for cooperation with the threading 28 of the shank. Bolts 31, extending transversely through the handle member, cooperate with threadless portions 32 of the shank to positively lock the handle in position.

Projecting outwardly beyond the threaded portion of the shank is a half circular extension 33 forming a stop (see Figs. 3 and 8).

Mounted for slidable movement longitudinally of the bore 34 of the tubular shank 25 is a plunger 35, and said plunger has a stem portion 36 of reduced diameter. A button 37 has a tubular extension 38 which fits over the outer end of the stem 36. The button 37 is rigidly secured to the stem by means of a headed extension 39. Surrounding the tubular extension 38 of the button is a sleeve 40, having its lower edge flanged inwardly, as at 41, below the lower edge of the tubular extension 38 of the button. The inwardly flanged lower edge 41 of said sleeve 40 has oppositely disposed projections 42 (see Fig. 7) which are cooperable with recesses 43 in the lower end of the button extension 38 to hold the sleeve 40 in a desired position of rotation around the tubular extension 38.

The upper portion of the bore of the shank 25 is of enlarged diameter, as at 44' and there is an annular shoulder 44 at the beginning of the enlarged diameter. This shoulder forms a seat for a washer 45, and the latter supports the lower end of a coiled spring 46. The upper end of the spring bears against a top washer 47 and in turn against the lower end of the sleeve 40. The upper end of the sleeve has a laterally projecting partial collar 48, which, when the parts are in the position of Fig. 6, is positioned in longitudinal alinement with the outer end of the stop 33 for a purpose to be hereinatfer described.

Intermediate the length of the shank portion 25 and on opposite sides of the bore of the shank are slots 49. A pin 50, which extends transversely through the plunger 35, has its ends projecting through and beyond the slots 49 of the shank. The pin 50 is press fitted in the plunger 35 so that it will not fall out.

In the use of the device, the lower end 51 of one of the front harness straps is permanently connected to the eye 14 of the inner plate 10. The lower end 52 of the other front harness strap is permanently connected to the eye 15 of the outer plate (see Fig. 9). Also connected to the outer plate is the key and operating handle assembly. Harness strap portions 53 and 54, which pass from the back of the parachutist between the legs and upwardy in front, extend through oval rings 55 on the sides, and then toward each other at the front of the parachutist.

Clasp hooks 56 and 57 are permanently connected to the ends of the strap portions 53 and 54. These hooks have the usual yielding guard members 58, which prevent accidental disengagement. The clasp 56 is engageable with the lower corner pin 18 between the two plates, and the clasp 57 is engageable with the opposite lower corner pin 24 between the plates.

Referring to Fig. 2, when the parts are in the position shown in this figure, the quick release mechanism is locked, and the two plates 10, 11, are rigidly connected to each other by the key head 26. When the flyer is in his equipment, ready for a jump, the partial knurled collar 48 is turned to the position of Fig. 2 so that inward pressure on the button 37 is limited by engagement of the collar 48 with the stop 33. The collar 48, and sleeve 40 connected thereto, are held in this position against accidental displacement by the engagement of the projections 42 on the lower end of the sleeve with the recesses 43 in the lower end of the tubular button extension 38.

As the parachutist nears the ground, if he desires to get rid of his chute and harness quickly, the first operation is to turn the knurled button 48 from the position of Fig. 2 to the position of Fig. 3. Then by pushing inwardly on the button 37, against the tension of the spring 46, the plunger 35 is moved inwardly, and the ends of the pin 50 are pushed out of the radial extensions 21 of the hole 20 of the outer plate to the dot and dash line position of Fig. 6. This then permits rotation of the handle 29 from the position of Fig. 2 to the position of Fig. 3, while the button is being depressed. Such partial rotation of the handle will change the key head 26 from a position at right angles to the keyhole to the position shown in Fig. 3, where the key head can pass outwardly through the keyhole 16, separating the inner and outer plates. This separation causes immediate release of the clasps 56 and 57 and permits the outer plate 11 to hang freely from the end of the strap 52 and the inner plate 10 to hang freely from the end of the strap 51. The pull of the chute will then cause the clasps 56 and 57 to slip through the rings 55 so that the entire harness is disengaged.

To reassemble the harness, the plates in the separated condition of Fig. 3 are pushed together until the tapered pins enter the respective holes. The plunger button 37 is then pressed inwardly against the tension of the spring 46, and the handle 48 is turned back to the position of Fig. 2 to rotate the key head 26 to locking position. When pressure on the plunger button 37 is released, the spring will return the parts to the position of Fig. 6, and the ends of the transverse pin 50 will enter a pair of radial slots 21 of the outer plate opening. The sleeve 40 is then rotated approximately 180° so that the knurled collar is positioned over the safety stop 33.

It is apparent from the above that the quick release hardware is so arranged that it cannot be accidentally released. On the other hand, the arrangement is such as to permit quick release of the harness by three operations. When the quick release device is locked, the clasp-supporting pins 18 and 24 are firmly supported so that they cannot bend when a pull is exerted. The arrangement is such that no sand, water or mud can prevent the operator from operating the release mechanism. As a special precaution, the slots 49 in the sides of the shank are enlarged below the transverse pin 50 and are formed with tapered bottoms 59 so that sand, gravel or mud, which might enter the slots, is readily pushed out upon movement of the pin 50.

Various changes and modifications may be made without departing from the spirit of the invention, and all of such changes are contemplated as may come within the scope of the claims.

What is claimed as the invention is:

1. A parachute harness clasp, comprising a plate having attached thereto one strap of a body-engaging parachute harness, a complementary plate having attached thereto another strap of a body-engaging parachute harness, a headed key revolubly engaging both of the plates and securing the same together when in a turned position of adjustment, there being a slot in one of the plates through which the headed portion of the key may pass for separation of the plates when the key is in another turned position of adjustment and the other plate being formed with stop slots, a control member telescopically engaged with the key and yieldingly, axially movably associated therewith, and a pin carried transversely by the control member and engageable in the stop slots of said other plate for preventing turning movement of the key except upon a predetermined axial movement of the control member to disengage said pin from said stop slots.

2. A parachute harness clasp, comprising a plate having attached thereto one strap of a body-engaging parachute harness, a complementary plate having attached thereto another strap of a body-engaging parachute harness, a headed key revolubly engaging both of the plates and securing the same together when in a turned position of adjustment, there being a slot in one of the plates through which the headed portion of the key may pass for separation of the plates when the key is in another turned position of adjustment, a control member telescopically engaged with the key and yieldingly, axially movably associated therewith, the control member and the other plate being formed with cooperating pin and stop means for preventing turning movement of the key except upon a predetermined axial movement of the control member effective to disengage said cooperating pin and stop means, and cooperating stop means associated with the control member and key adjustable to permit or prevent axial movement of the control member.

3. A parachute harness clasp, comprising a plate having attached thereto one strap of a body-engaging parachute harness, a complementary plate having attached thereto another strap of a body-engaging parachute harness, said plates being formed with complementary engaging tapered pins and sockets aiding in holding the plates together, a portion of one plate being off-set from the other plate and certain of said pins extending between the off-set portions of the plates at right angles to the planes thereof, and a locking member manipulatively carried by one plate and engaging the other plate and effective, in a certain position, to releasably lock said plates together.

4. A parachute harness clasp, comprising a plate having attached thereto one strap of a body-engaging parachute harness, a complementary plate having attached thereto another strap of a body-engaging parachute harness, said plates being formed with complementary engaging tapered pins and sockets aiding in holding the plates together, a portion of one plate being off-set from the other plate and certain of said pins extending between the off-set portions of the plates at right angles to the planes thereof, portions of the last-mentioned pins between the plates being adapted to be engaged by hooked extremities of other straps of a body-engaging parachute harness, and a locking member manipulatively carried by one plate and engaging the other plate and effective, in a certain position, to releasably lock said plates together.

5. A parachute harness clasp, comprising an inner plate having attached thereto one strap of a body-engaging parachute harness, a complementary outer plate having attached thereto another strap of a body-engaging parachute harness, said plates being formed with complementary engaging tapered pins and sockets aiding in holding the plates together, a portion of one plate being off-set from the other plate and certain of said pins extending between the off-set portions of the plates at right angles to the planes thereof, portions of the last-mentioned pins between the plates being adapted to be engaged by hooked extremities of other straps of body-engaging parachute harness, a headed key revolubly engaging both of the plates and locking the same together when in a turned position of adjustment, there being a slot in the inner plate through which the headed portion of the key may pass for separation of the plates when the key is in another position of adjustment, a control member telescopically engaged with the key and yieldingly, axially movably associated therewith, and the control member and said outer plate being formed with cooperating pin and stop means effective when engaged to prevent turning movement of the key except upon a predetermined axial movement of the control member being effective to disengage said pin and stop means.

FRANK J. SULLIVAN.

REFERENCES CITED

The following references are of record in the file of this patent:

UNITED STATES PATENTS

| Number | Name | Date |
|---|---|---|
| 2,108,716 | Kuhleman | Feb. 15, 1938 |
| 2,305,572 | Johnson | Dec. 15, 1942 |